UNITED STATES PATENT OFFICE.

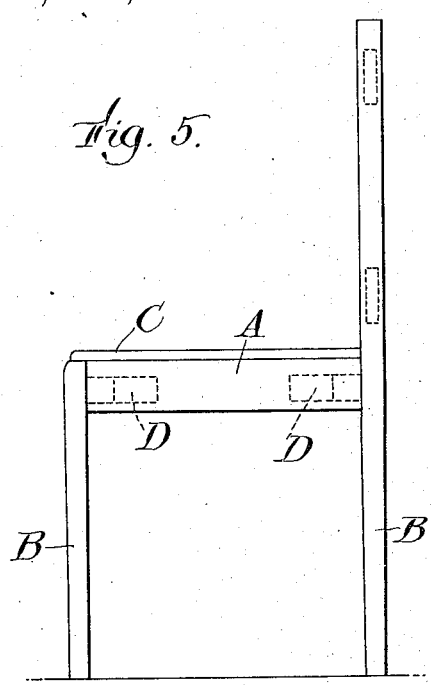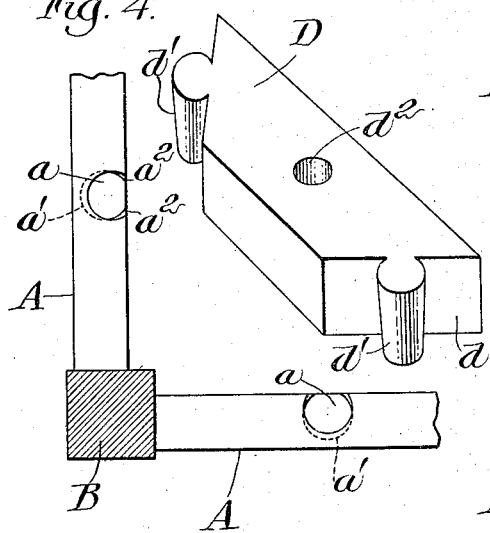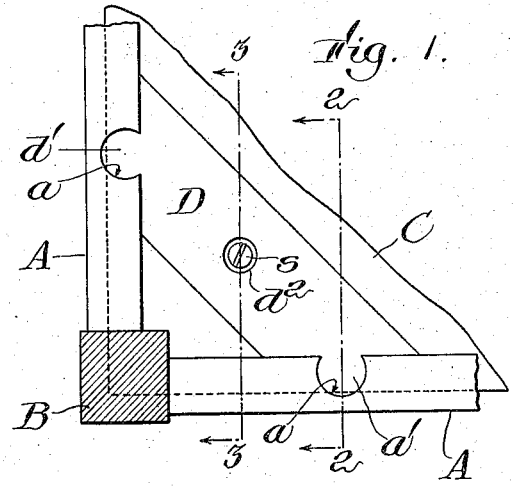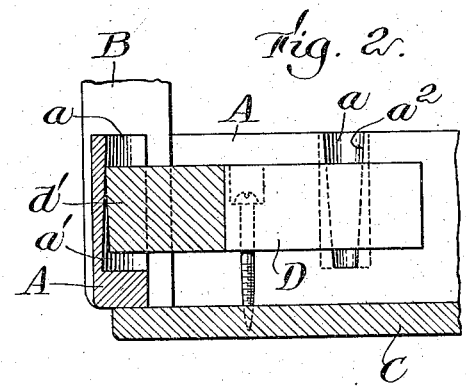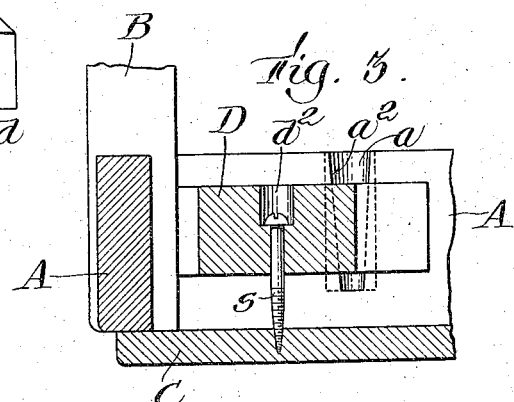

ASHTON P. DERBY, OF GARDNER, MASSACHUSETTS, ASSIGNOR TO P. DERBY & COMPANY, INC., OF GARDNER, MASSACHUSETTS, A CORPORATION OF MASSACHUSETTS.

CORNER-JOINT.

1,167,155.   Specification of Letters Patent.   Patented Jan. 4, 1916.

Application filed May 1, 1914. Serial No. 835,744.

*To all whom it may concern:*

Be it known that I, ASHTON P. DERBY, a citizen of the United States, and resident of Gardner, in the county of Worcester and State of Massachusetts, have invented new and useful Improvements in Corner-Joints, of which the following is a specification.

This invention relates to corner joints for furniture, and while susceptible of use in many situations where a strong and rigid joint is required, it is particularly designed as a corner joint for chair frames. For the purpose of illustration therefore I will describe an embodiment of the invention suitable for wooden chairs, but it will be understood that the invention is applicable generally to other structures, and its more general application is contemplated in the claim.

In the accompanying drawings which illustrate one embodiment of the invention,—Figure 1 is a bottom view of a corner joint containing the invention; Fig. 2 is a section on line 2—2 of Fig 1; Fig. 3 is a section on line 3—3 of Fig 1; Fig. 4 is a bottom view of the corner joint with the brace member, which is shown in perspective, removed; and Fig. 5 is a side view of a chair in which said joint is employed.

Referring to the drawings, A, A represent the two angle members of the corner joint, secured at their ends to the corner piece B by mortise and tenon or in any usual way. In the embodiment herein illustrated, the corner piece B is one of the legs of the chair and the angle members A, A are two of the side rails forming the seat frame.

C is the usual cover resting on the angle members A, A, at the corners of the chair, and may be one of the corners of a solid seat, or one of the corner portions of a cane, rush or upholstered seat.

D is a diagonal brace member, connecting the angle members A. The ends of the brace D are beveled, as shown at $d$, to fit the inner surfaces of the angle members A, A; and each beveled end is provided with an integral, vertically extending, tenon-like locking projection $d'$, which is preferably circular in cross section, and is slightly tapered or cone-shaped (as best shown in Figs. 4 and 2) from its outer toward its inner end.

The angle members A, A, are each provided with a socket $a$ to engage the locking projections $d'$. Each socket $a$ is in the form of a circular bore entering through the bottom of member A, the side of the bore being open through the side of the member A. The axis of said bore is inclined at a slight angle with the inner surface of the member A, so that the inner end $a'$ of the bore is a little deeper from the surface of the member A than the mouth of the bore. This results in the gradual narrowing or tapering of the side opening $a^2$ of the bore from its mouth toward its inner end.

The projections $d'$ of the brace member D are inserted into the open ends or mouths of the sockets $a$ and forced toward the inner ends of the sockets as far as possible. The tapering projections $d'$ thereupon coöperate with the converging or narrowing lips of the side openings $a^2$, drawing the beveled ends $d$ of the brace member tight against the inner surfaces of angle members A, by a wedge-like action, locking the angle members A, A, together and to the corner piece B, and forming a firm and tight joint of exceptional strength and rigidity.

When the brace member D has been forced home as far as possible, a screw $s$ is passed through a countersunk hole $d^2$ and screwed into the cover piece C, thus holding the brace member securely in locked position. If desired the joint between $a$ and $b$ may be glued as additional security. By reason of the wedging action of the tapered projections $d'$ and the tapered openings $a^2$ there is little likelihood of the joints ever working loose, but if they should loosen by shrinkage of the wood, or for any other reason, the joints may readily be drawn tight by setting up the screw $s$ and forcing the projections $d'$ deeper into the sockets $a$.

Instead of using cylindrical holes $a$ with their axes inclined to the inner surfaces of angle members A, the holes could be made tapered with their axes parallel to the inner surfaces of angle members A, the effect in either case being to produce tapered side openings $a^2$ having the converging lips.

I claim:

A corner joint comprising two angle members, a brace member, and interlocking connections between the angle members and the ends of the brace member, said interlocking connections comprising a socket in each of the angle members, both the mouth and the side of each socket opening through the sides of the angle member, a tapering projection on each end of the brace member, said sockets being correspondingly inclined and said sockets and projections being adapted to draw and hold the brace member and the angle members together by a wedge-like action, a cover piece supported on said angle members at the side opposite to the mouths of said sockets and spaced from said brace member, and a screw connecting said brace members and said cover piece to draw and hold said projections tight in said sockets.

Signed by me at Gardner, Massachusetts, this twenty-seventh day of April, 1914.

ASHTON P. DERBY.

Witnesses:
 LATON M. ROBINSON,
 CHARLES L. CRABTREE.